United States Patent [19]

Henriksson

[11] Patent Number: 5,605,299

[45] Date of Patent: Feb. 25, 1997

[54] OPEN-FACE FISHING REEL OF THE FIXED-SPOOL TYPE HAVING A DISCONNECTIBLE FREE-WHEELING HUB

[75] Inventor: Bengt-Åke Henriksson, Svängsta, Sweden

[73] Assignee: Abu AB, Svängsta, Sweden

[21] Appl. No.: 570,529

[22] Filed: Dec. 11, 1995

[51] Int. Cl.$^6$ .................................................. A01K 89/02
[52] U.S. Cl. ........................................................ 242/247
[58] Field of Search ..................................... 242/247, 248; 188/82.84

[56] References Cited

U.S. PATENT DOCUMENTS 4,193,562  3/1980  Gifford ..................................... 242/248
5,370,330  12/1994  Uehara et al. ............................ 242/247

FOREIGN PATENT DOCUMENTS

440231  8/1991  European Pat. Off. ............... 242/247

Primary Examiner—Daniel P. Stodola
Assistant Examiner—Emmanuel M. Marcelo
Attorney, Agent, or Firm—Browdy and Neimark

[57] ABSTRACT

An open-face fishing reel of the fixed-spool type comprises a housing, a rotor shaft, which is rotatably mounted in the housing and supports a rotor non-rotatably connected therewith, and a free-wheeling hub mechanism. The free-wheeling hub mechanism has an outer ring which is fixedly connected to the housing, an inner ring which is non-rotatably mounted on the rotor shaft and located inside the outer ring, and an annular roll holder which is placed in an annular gap between the two rings and by resilient shafts, supports the rolls. The rolls are rotatable about the shafts and held by these in resilient abutment against the inner ring. The roll holder is, within narrow limits, turnable between a first turning position, in which the rolls are clamped between the inner ring and ramp surfaces of the outer ring, thereby preventing rotation of the rotor in one direction, and a second turning position, in which the rolls are released and abut against the inner ring only to be rotated thereby.

6 Claims, 10 Drawing Sheets

OPEN-FACE FISHING REEL OF THE FIXED-SPOOL TYPE HAVING A DISCONNECTIBLE FREE-WHEELING HUB

FIELD OF THE INVENTION

The present invention relates to an open-face fishing reel of the fixed-spool type.

DESCRIPTION OF THE PRIOR ART

Prior-art fishing reels of this type have a spindle rotatably and axially displaceably mounted in a housing and carrying a line spool at one end thereof. The line spool is non-rotatably connected to the spindle and axially fixed thereon. A drive shaft extending at right angles to the spindle is mounted in the housing to be rotated by means of a handle. Oscillating means are connected to the drive shaft and the spindle. When the handle is rotated for retrieving a fishing line fixed on the line spool, the drive shaft rotates and drives the oscillating means, in turn oscillating the spindle and, thus, the line spool in the longitudinal direction of the spindle. Through a gear transmission provided in the housing, the handle drives a hollow shaft which projects from the housing and is coaxial with the spindle extending through the shaft. The hollow shaft then drives a rotor non-rotatably mounted thereon and carrying a bail mechanism for winding the line onto the line spool.

A known bail mechanism has a bail for winding the line onto the line spool and two attachments provided on the rotor diametrically opposite each other. At its ends, the bail is pivotally fixed to the attachments by means of mounting elements. To permit pivotal movement of the bail, the mounting elements are rotatably connected to the attachments by screws forming a bail pivot shaft at right angles to the spindle. The bail is pivotable between an operative folded-in position in which it extends substantially at right angles to the spindle, and an inoperative folded-out position in which it is located on the opposite side of the spindle and makes an angle therewith which is of the order of 45°. The bail is maintained in its two positions by a spring member mounted in one of the attachments. A line roller is attached to one end of the bail.

Before a cast is to be made, the bail is pivoted to the folded-out position so as to release the line from the line roller to be seized with the index finger of one hand. During the cast, the line is paid out from the line spool which, like the rotor, remains still during the cast. When line retrieve is again effected after the cast, the bail is automatically swung back to the folded-in position, and the line is placed on the line roller. During line retrieve, the line is thus wound onto the line spool which, in contrast to the rotor, does not rotate but performs an axially directed oscillating motion. As a result, the line is spread over the spool.

The bail can be seized with one hand for pivoting from the folded-in position to the folded-out position. In some types of fishing reels the bail is however pivoted to the folded-out position before a cast by means of a trigger.

In order to place the rotor in a suitable position before a cast, by which is meant that the line roller or, if the fishing reel is fitted with a trigger, the trigger and the line roller should reach a position which is suitable for index finger operation and in which the fishing line or the trigger and the fishing line can readily be seized with the index finger of one hand, some prior-art fishing reels of this type are provided with a special stop mechanism. When, by rotation of the handle in the opposite direction to the retrieving direction, the rotor rotates in the opposite direction to the winding-up direction, the stop mechanism stops the rotor in a predetermined stop position, in which the line roller or the trigger and the line roller are in a position which is readily seizable with the index finger.

In a certain kind of fishing, it is desirable that the rotor, independently of the rotating position, is stopped immediately or practically immediately when one tries to rotate it in the opposite direction to the winding-up direction. To carry out such a substantially immediate stop of the rotor, some prior-art fishing reels are provided with a so-called free-wheeling hub, which permits rotation of the rotor in the winding-up direction, but not in the opposite direction. The purpose is that, when during line retrieve a fish takes a bait fixed to the fishing line, one should be able to respond to this immediately by jerking the line and, thus, the bait towards oneself to make the fish get properly stuck on the bait. Such a jerk is made possible by the fishing line, when the retrieve began, being placed on the line roller attached to the bail, which in turn is attached to the rotor. Consequently, the fishing line cannot be further paid out from the line spool, since such paying-out would require rotation of the bail and, thus, the rotor in the opposite direction to the winding-up direction.

In another kind of fishing, for instance fishing with live bait, it is desirable that the bait should be able to pull out the fishing line still more, also when this is placed on the line roller. To this end, it must be possible to rotate the rotor in the opposite direction to the winding-up direction without being stopped. This is possible when using fishing reels having no stop mechanism or free-wheeling hub, but also fishing reels having a stop mechanism or free-wheeling hub whose stop function is disconnectible. These fishing reels are thus adjustable between their basic function, i.e. the first-mentioned function or single-stop function, and the second function or multistop function, respectively, and the last-mentioned function, i.e. the release function.

In a prior-art open-face fishing reel of the fixed-spool type, use is made of a free-wheeling hub of conventional type in order to provide the multistop function. The free-wheeling hub has an outer ring and an inner ring concentrically arranged in the outer ring. A plurality of rolls, the axes of which are parallel with the common axis of the rings, are arranged in the annular gap between the two rings. For each roll, the outer ring has an internal, ramp-like cam surface, which together with the outer circumference of the inner ring forms a wedge-shaped chamber for the roll. Each roll is pressed by a spring abutting against the circumferential surface of the roll obliquely inwards against the nip formed by the chamber and obliquely against its cam surface on the outer ring, the roll applying a higher pressure to the outer ring than to the inner ring. When an attempt is made to rotate the inner ring relative to the outer ring in one direction, the inner ring immediately moves the rolls into the nips formed by the wedge-shaped chambers, whereby the inner ring is pinched immediately. When the inner ring is rotated relative to the outer ring in the other direction, the rolls are moved out of the nips and make it possible for the inner ring to rotate. The rolls are held by the springs and therefore do not rotate while abutting against the inner ring, which therefore slides along the circumferential surface of the rolls during its rotation. This makes the rotation of the inner ring relatively sluggish and causes wear of both the inner ring and the rolls, which in turn may cause some noise. When this free-wheeling hub is used in a fishing reel, the outer ring is non-rotatably connected to the fixed housing, and the inner ring is non-rotatably connected to the rotor. As will be apparent, said second direction of rotation of the inner ring corresponds to a rotation of the rotor in the winding-up direction.

SUMMARY OF THE INVENTION

The object of the present invention is to provide an open-face fishing reel of the fixed-spool type, which is fitted with a free-wheeling hub, in which the drawback described above is obviated.

According to the invention this object is achieved by means of an open-face fishing reel of the fixed-spool type, comprising a housing;

a spindle mounted in the housing and extending forwardly therefrom;

a hollow rotor shaft which is rotatably mounted on the spindle and supports a gear wheel non-rotatably connected to the rotor shaft;

a drive shaft mounted in the housing;

a handle for rotating the drive shaft;

a gear drive which is non-rotatably arranged on the drive shaft and meshes with the gear wheel of the rotor shaft, for rotating the rotor shaft on rotation of the drive shaft;

a line spool rotatably mounted on the spindle in front of the rotor shaft;

a rotor non-rotatably mounted on the rotor shaft and supporting a bail mechanism which is arranged, upon rotation of the rotor in one direction, to wind a fishing line onto the line spool; and a free-wheeling hub mechanism which is operatively arranged between the housing and the rotor shaft and comprises an outer ring fixedly connected to the housing coaxially with the rotor shaft, an inner ring non-rotatably mounted on the rotor shaft and positioned inside the outer ring, an annular gap extending between the two rings, and an annular roll holder arranged in the gap and supporting at least two rolls, whose axes are substantially parallel with the rotor shaft and which are uniformly distributed around the rotor shaft;

wherein the rolls are rotatably supported on resilient shafts connected to the roll holder and adapted to hold the rolls in resilient abutment against the inner ring;

wherein the outer ring has, for each roll, an internal ramp surface, which together with the inner ring defines a space intended for the roll and widening in said one direction of rotation of the rotor;

wherein the roll holder is, within narrow limits, turnable back and forth about the rotor shaft between a first turning position to which the roll holder is movable by rotation of the inner ring in the opposite direction to said one direction and in which the rolls are positioned in the narrow portion of the respective spaces and clamped between the inner ring and the associated ramp surface of the outer ring, thereby preventing rotation of the rotor in the opposite direction to said one direction, and a second turning position, to which the roll holder is movable by rotation of the inner ring in said one direction and in which the rolls are positioned in the wide portion of the respective spaces and abut against the inner ring only to be rotated thereby.

BRIEF DESCRIPTION OF THE DRAWINGS

The invention will now be described in more detail with reference to the accompanying drawings in which:

FIGS. 3–6 concern a first state of the fishing reel in FIG. 1,

DESCRIPTION OF THE PREFERRED EMBODIMENT

Figure 1:
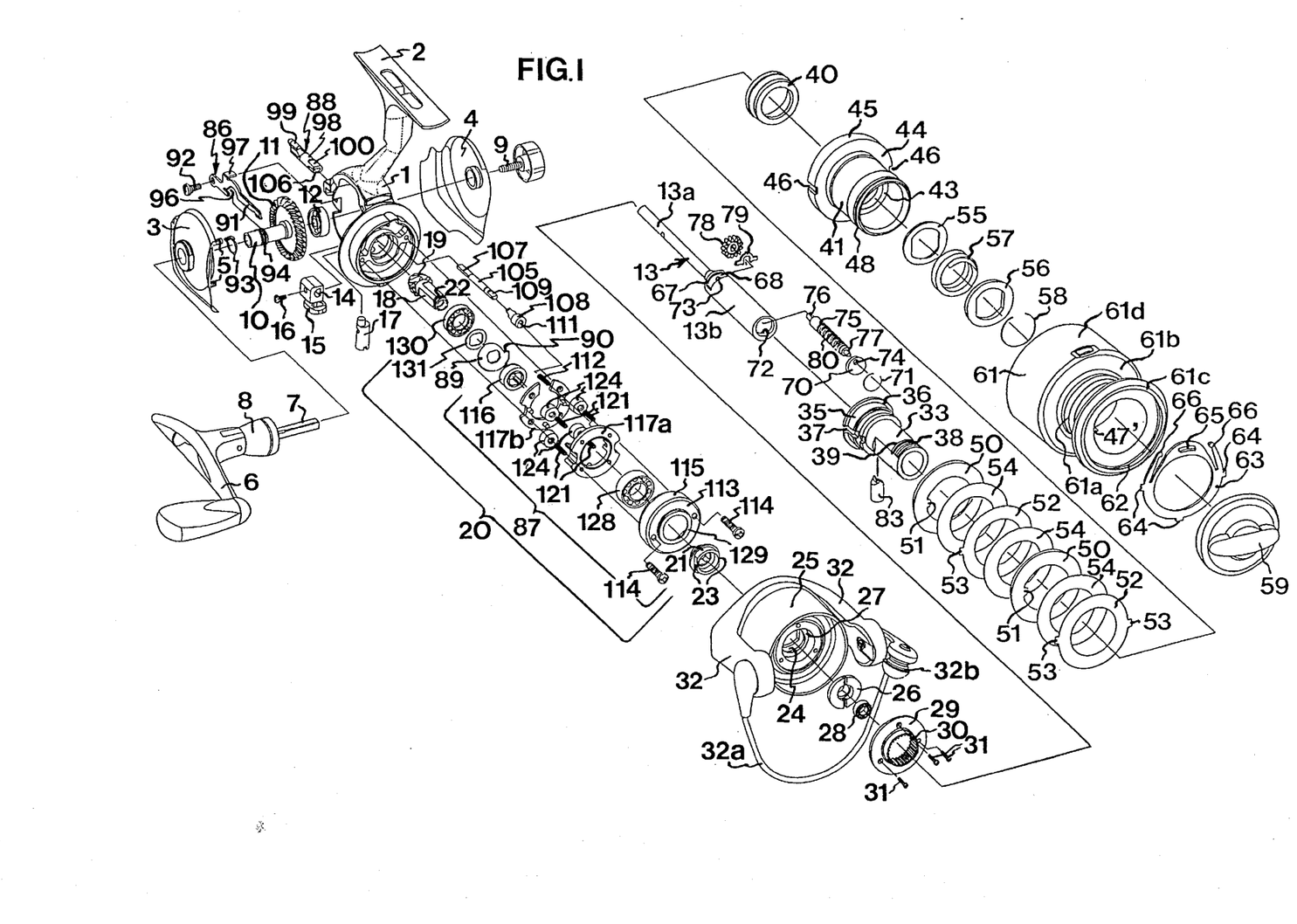
FIG. 1 is an exploded view illustrating an open-face fishing reel of the fixed-spool type according to the present invention.
Figure 2:
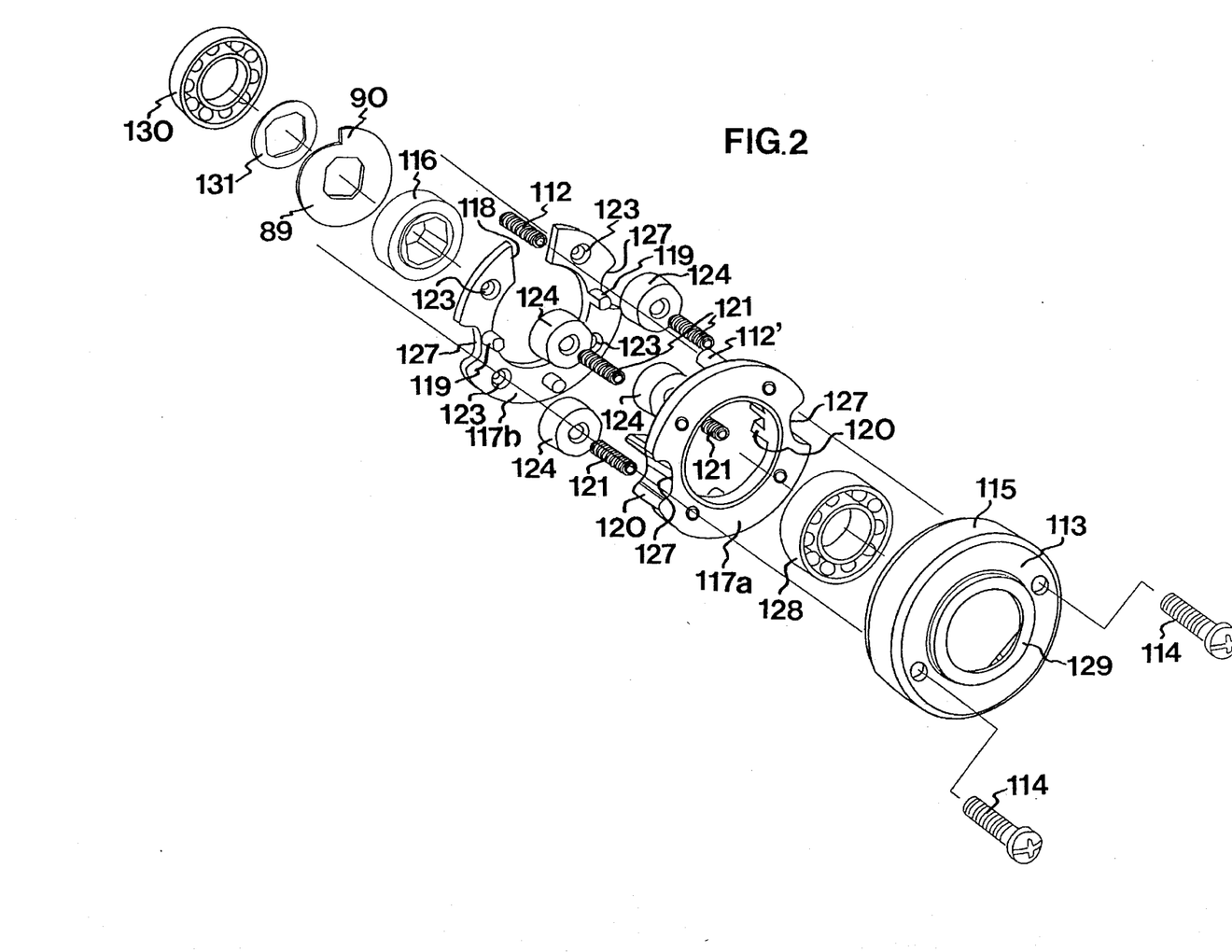
FIG. 2 is an exploded view illustrating, on a larger scale, an antireverse unit included in the fishing reel.

The open-face fishing reel of the fixed-spool type shown in FIG. 1 comprises a housing 1 with a foot 2 for fixing the fishing reel to a fishing rod. The housing 1 comprises two side plates 3 and 4, which are attached to the main part of the housing by means of screws 5. A handle 6 is rotatably mounted in the housing 1. The shaft 7 of the handle 6 is axially fixed by means of a shoulder 8 on the handle side and by means of a screw 9 having a knob-shaped head on the opposite side. The screw 9 is screwed into a threaded axial bore at the free end of the shaft 7. The shaft 7 is of square cross-section over the major part of its length and non-rotatably supports a gear drive 10 which has axially directed teeth 11 on its side facing the handle side. The gear drive 10 is rotatably mounted in the housing 1 by means of a ball bearing 12.

Figure 3:
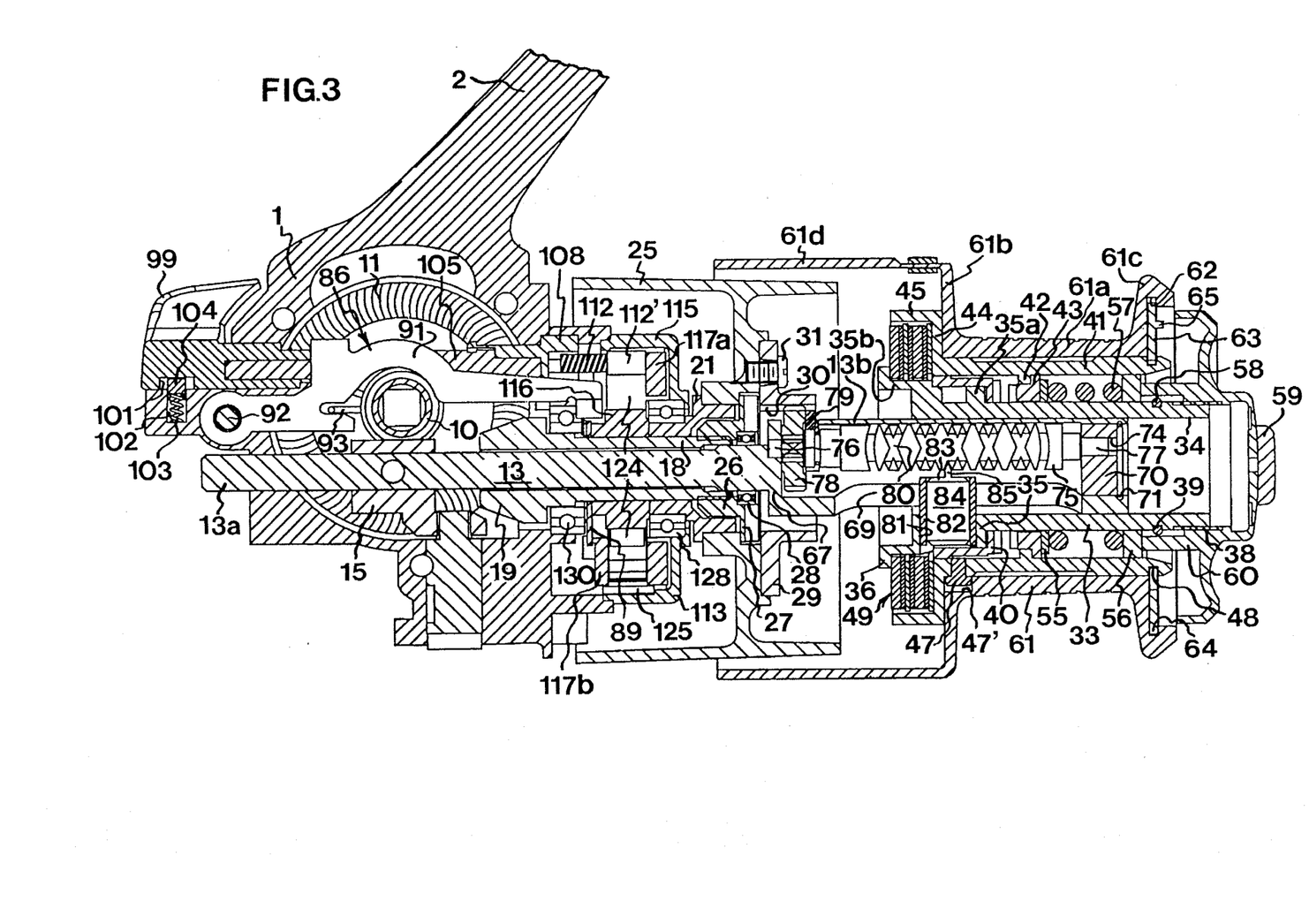
FIG. 3 being an axial longitudinal section of the fishing reel.

It should be noted that "forwards", "backwards", "front" and "rear" in the specification and in the accompanying claims are used with reference to the position of the fishing reel when, mounted on a fishing rod, used by an angler. The direction forwards thus is the direction to the right in FIG. 3.

A spindle element 13 has a rear spindle member 13a which is mounted in the housing 1 and projects forwardly therefrom, and a front spindle member 13b integrated with the rear spindle member 13a and positioned in front of the housing 1. The rear spindle member 13a extends through a hole 14 in an adjusting slide 15 which is included in a mechanism for adjusting the axial position of the rear spindle member 13a and, thus, the entire spindle element 13 relative to the housing 1. The hole 14 formed in the slide 15 and having the same cross-sectional shape as the rear spindle member 13a has on one side a planar boundary wall (see FIG. 1) and therefore holds the rear spindle member 13a non-rotatable in the slide 15. The spindle element 13 is axially fixed in the slide 15 by means of a locking screw 16. The adjusting mechanism also comprises a turnable eccentric 17 for shifting the slide 15 and, thus, the spindle element 13.

The rear spindle member 13a of the spindle element 13 also extends through a rotor shaft 18 which is rotatably mounted on the rear spindle member 13a. The rotor shaft 18 supports at its rear end a gear wheel 19 which is non-rotatably connected therewith and meshes with the teeth 11 of the gear drive 10. The rotor shaft 18 has two pairs of diametrically opposed planar surfaces (of which only one in each pair is to be seen in FIG. 1) and extends through an anti-reverse unit 20 which will be described in detail below, and through a distance sleeve 21, whose through-hole is of a cross-section corresponding to the cross-sectional shape of the rotor shaft 18 and which is therefore non-rotatably supported on the rotor shaft 18. The rotor shaft 18 has an external thread 22 at its front end.

The distance sleeve 21 has, in its front portion, two diametrically opposed planar surfaces 23 and extends with this portion into a through-hole 24 in a rotor 25. The hole 24 has in its rear part the same cross-sectional shape as the front portion of the distance sleeve 21, and so the rotor 25 is non-rotatably supported on the rotor shaft 18. A nut 26 is screwed on the thread 22 of the rotor shaft 18 and abuts against a circumferential shoulder 27 formed in the front part of the hole 24, said front part being of circular cross-section. Thus, the rotor 25 is axially fixed between the distance sleeve 21 and the nut 26. A ball bearing 28 is arranged between the nut 26 and the rear spindle member 13a. A gear rim 29 with internal teeth 30 is non-rotatably connected to the rotor 25 by means of screws 31.

The rotor 25 is substantially in the shape of a cylinder and supports two diametrically opposed arms 32 which are integrated with the rotor and extend axially along the rotor at a radial distance therefrom. The arms 32 constitute mountings for a pivotable winding-up bail 32a which supports a line roller 32b at its one end. The bail 32a, which is of known construction, is pivotable between an operative folded-in position, which is shown in FIG. 1 and in which it extends substantially at right angles to the axis of the rotor shaft 18, and an inoperative folded-out position, in which it is located on the opposite side of this axis and makes an angle therewith which is of the order of 45°.

A hollow line spool shaft 33 is non-rotatably connected, in a manner described in more detail below, to the front spindle member 13b of the spindle element 13. The hollow shaft 33 has a through bore 34, the diameter of which is equal to the diameter of the front spindle member 13b. The shaft 33 has a rear portion 35, whose outer diameter is greater than that of the rest of the shaft. This rear portion 35 consists of a circumferential front shoulder 35a and a circumferential rear shoulder 35b which has a greater diameter than the front shoulder. The rear shoulder 35b has a circumferential, radially projecting rear end flange 36. Two diametrically opposed, axially directed slits 37 (of which only one is to be seen in FIG. 1) extend along the rear shoulder 35b and through the end flange 36 thereof. The shaft 33 has an external thread 38 at its front end and an external circumferential groove 39 just behind this thread. Two planar surfaces (of which only one is to be seen in FIG. 1) are formed diametrically opposite each other in the front portion of the shaft 33, thereby forming a flat.

A rear bearing sleeve 40 is arranged on the front shoulder 35a of the rear shaft portion 35 and is held non-rotatable thereon with press fit.

An inner sleeve member 41, which in its central portion has a circumferential, internal shoulder 42 and accommodates a front bearing sleeve 43, which with press fit is pressed into the inner sleeve member 41 into abutment against the shoulder 42, is rotatably mounted on the shaft 33 by means of the bearing sleeves 40 and 43. The inner sleeve member 41 has, in its rear portion, a circumferential, radially projecting flange 44 and, projecting backwards a short distance therefrom, a cylindrical portion 45. The cylindrical portion 45 has two diametrically opposed slits 46 extending axially into the cylindrical portion 45 from the rear edge thereof. The inner sleeve member 41 has, immediately in front of the flange 44, a radially projecting pin 47 and has, in its front portion, an external circumferential groove 48.

A line spool drag 49 comprises two drag washers 50, which have two diametrically opposed, radially inwardly directed projections 51 and are non-rotatably connected to the shaft 33 by these projections 51 engaging in the slits 37 in the rear portion 35 of the shaft, two drag washers 52 which have two diametrically opposed, radially outwardly directed projections 53 and are non-rotatably connected to the inner sleeve member 41 by these projections 53 engaging in the slits 46 in the cylindrical portion 45, and three friction washers 54. The line spool drag 49 is composed of two groups of washers, each group comprising a drag washer 50 non-rotatably connected to the shaft 33, a drag washer 52 non-rotatably connected to the inner sleeve member 41, and an intermediate friction washer 54, as well as of a friction washer 54 arranged between the two groups. The line spool drag 49 is provided between the rear end flange 36 of the shaft 33 and the flange 44 of the inner sleeve member 41, thereby producing an adjustable braking effect between the shaft 33 and the inner sleeve member 41, the adjustability being described in more detail below.

A rear and a front supporting ring 55 and 56, respectively, whose central hole has a shape corresponding to the cross-sectional shape of the shaft 33 in the front portion thereof formed with the planar surfaces (the flat), are non-rotatably mounted on the shaft 33 in said portion. The rear supporting ring 55 abuts against the front side of the front bearing sleeve 43. A compression spring 57 is provided on the shaft 33 between the two supporting rings 55 and 56. A snap ring 58 is arranged in the circumferential groove 39 of the shaft 33 for preventing the front supporting ring 56 and thus the compression spring 57 and the rear supporting ring 55 and thus also the front bearing sleeve 43 and the inner sleeve member 41 from being drawn off the shaft 33.

A buzz mechanism (not shown), which has axially projecting resilient tongues, can be provided between the two bearing sleeves 40 and 43, the resilient tongues engaging with front teeth (not shown) on the rear bearing sleeve 40 and rear teeth (not shown) on the front bearing sleeve 43 for producing a buzz sound when the inner sleeve member 41 is rotated around the shaft 33.

An adjusting knob 59 with an internally threaded sleeve portion 60 is screwed on the thread 38 of the shaft 33. The rear end of the knob 59, i.e. the free end of the sleeve portion 60, abuts against the front supporting ring 56. When the knob 59 is screwed further inwards, it presses the front supporting ring 56 backwards in order to press, via the compression spring 57, the rear supporting ring 55 and the front bearing sleeve 43, the inner sleeve member 41 backwards more forcefully. As a result, the washers 50, 52 and 54 of the line spool drag 49 are pressed together more firmly between the rear end flange 36 of the shaft 33 and the flange 44 of the inner sleeve member 41, such that the braking effect of the line spool drag 49 increases. Correspondingly, the braking effect of the line spool drag 49 decreases, when the knob 59 is screwed in the opposite direction, i.e. is moved to the right in FIG. 3.

An outer sleeve member 61, which has a central portion 61a, on which a line (not shown) is to be wound, two radially projecting end flanges 61b, 61c positioned on both sides of the central portion 61a, and a backwardly directed, cylindrical portion 61d reinforcing the rear end flange 61b, is passed over the inner sleeve member 41. The outer sleeve member 61 is non-rotatable relative to the inner sleeve member 41 by the projecting pin 47 thereof engaging in a corresponding recess 47' inside the outer sleeve member 61, when the rear end flange 61b thereof abuts against the flange 44 of the inner sleeve member 41. In this position, the cylindrical portion 61d of the outer sleeve member 61 extends backwards a distance over the rotor 25.

The front end flange 61c of the outer sleeve member 61 has an internal circumferential groove 62. A releasable locking element 63 in the form of a spring element engages both in this circumferential groove 62 and in the circumferential groove 48 in the front portion of the inner sleeve member 41. The locking element 63, which thus holds the outer sleeve member 61 axially fixed to the inner sleeve member 41, is resiliently releasable from the circumferential groove 48 of the inner sleeve member 41 in order to permit release of the outer sleeve member 61 from the inner sleeve member 41. The locking element 63 consists of a ring, whose inner diameter is slightly greater than the outer diameter of the inner sleeve member 41 in the front portion. The ring has three radially outwardly directed projections 64, which in the position shown in the drawings project laterally and downwards, a forwardly projecting, upper gripper lug 65, and two resilient arms 66 projecting substantially tangentially upwards. The projections 64 and the resilient arms 66 engage in the circumferential groove 62 of the outer sleeve member 61, the locking element 63 being pressed downwards by the resilient arms 66, such that its upper portion engages in the circumferential groove 48 of the inner sleeve member 41. When the locking element 63 is to be released, the lug 65 is pressed upwards, whereby the locking element is raised, against the spring action of the arms 66, out of its engagement with the circumferential groove 48 of the inner sleeve member 41, such that the outer sleeve member 61 can be drawn off the inner one.

When one wants to fish with a line spool, whose central portion has a different depth or whose end flanges are designed in a different manner, or if one wants to easily replace the fishing line by a new fishing line of a different thickness, the adjusting knob 59 is screwed off from the shaft 33, whereupon the locking element 63 is released from the circumferential groove 48 of the inner sleeve member 41. The outer sleeve member 61 is then drawn off the inner sleeve member 41 and replaced by a new outer sleeve member, which has the desired shape and carries a line of the desired thickness. When the new outer sleeve member reaches the position shown in FIG. 3, its locking element snaps into the circumferential groove 48 of the inner sleeve member 41. After that, the adjusting knob 59 is screwed on again.

The front spindle member 13b of the spindle element 13 has the shape of a circular sleeve and is defined against the rear spindle member 13a by a rear end wall 67. The front spindle member 13b has a recess 68, which is formed just in front of the rear end wall 67, and a longitudinal slit 69 formed substantially diametrically opposite the recess 68 and extending along the major part of the length of the front spindle member 13b (see FIG. 3). The front spindle member 13b is closed at its front end by means of a disk 70 which is inserted therein and forms a front end wall and is kept in position by means of a snap ring 71 engaging in an inner circumferential groove 72 at the front end of the front spindle member 13b. A hole 73 is formed in the rear end wall 67, and a hole 74 is formed in the front end wall or the disk 70 flush with the hole 73. The two holes 73 and 74 are eccentrically positioned by being radially offset relative to the axis of the sleeve bore of the front spindle member 13b in the direction of the side where the recess 68 is formed. This axis is, in turn, radially offset in the same direction relative to the axis of the cylinder defining the outer limitation of the circular sleeve. As shown in the drawings, this results in a greater thickness of the material in that portion of the sleeve-shaped front spindle member 13b where the slit 69 is formed, than in the diametrically opposed portion where the recess 68 is formed.

A screw 75 is rotatably mounted in the front spindle member 13b by means of a rear journal 76 which is mounted in the hole 73 in the rear end wall 67, and a front journal 77 which is mounted in the hole 74 in the front end wall or disk 70. The rear journal 76 has two diametrically opposed planar surfaces forming a flat, thereby non-rotatably supporting just opposite the recess 68 a gear wheel 78, whose central hole has a cross-sectional shape corresponding to the cross-sectional shape of the rear journal 76 in the portion of its flat. The gear wheel 78 is retained in its position just opposite the recess 68 by means of a retaining yoke 79. The gear wheel 78 extends through the recess 68 and meshes with the teeth 30 of the gear rim 29. The screw 75 is a so-called endless screw and has an endless thread groove 80 extending helically in one direction and returning helically in the other direction.

The line spool shaft 33 has a radial through-hole 81 in its rear portion 35. A bushing 82 is inserted into the hole 81 and extends into the sleeve-shaped front spindle member 13b via the slit 69 thereof, whose width is substantially equal to the outer diameter of the bushing 82. As a result, the line spool shaft 33 is non-rotatably connected to the front spindle member 13b. A groove-follower pin 83 has a cylindrical portion 84 which is rotatably arranged in the bushing 82, and a blade-shaped portion 85 having substantially the same width as the endless thread groove 80 of the screw 75 and engaging therein. The groove-follower pin 83 is retained in the bushing 82 by the rear bearing sleeve 40.

When rotating the handle 6 in the retrieving direction, i.e. the direction in which a fishing line (not shown) attached to the outer sleeve member 61 is retrieved, the gear drive 10 is rotated in order to, by meshing with the gear wheel 19, rotate the rotor shaft 18 such that the rotor 25 and thus the winding-up bail 32a supported by the rotor arms 32 are rotated in the winding-up direction. Consequently, the fishing line is wound onto the line spool which is formed of the two sleeve members 41 and 61 and which, in contrast to the rotor, does not rotate but performs an axially directed oscillating motion. As the rotor 25 rotates, also the gear rim 29 rotates, which by meshing with the gear wheel 78 then also rotates the endless screw 75. By the rotation of the screw 75, an axial oscillating motion is imparted to the groove-follower pin 83 engaging in the thread groove 80, and thus also to the line spool shaft 33 and the line spool 41, 61, which results in the line being evenly spread over the line spool 41, 61.

Before a cast is to be made, the bail 32 is pivoted to the folded-out position, whereby the fishing line is released from the line roller 32 to be seized with the index finger of one hand. During the cast, the line is paid out from the line spool 41, 61, which, like the rotor 25, remains still during the cast. When line retrieve is again effected after the cast, the bail 32a is automatically swung back to the folded-in position, and the line is placed on the line roller 32b.

The fishing reel shown in the drawings is adjustable between the three functions described above, viz. the single stop function, the multistop function and the release function.

When the single stop function is connected, the rotation of the rotor 25 in the opposite direction to the winding-up direction (for instance, when rotating the handle 6 in the opposite direction to the retrieving direction) is stopped in a predetermined rotor position, in which the line roller 32*b* is located in its upper position, i.e. turned 90° anticlockwise from the position shown in FIG. 1. In this predetermined rotor position, the fishing line placed on the line roller 32*b* can be easily seized with the index finger of one hand. This single stop function is achieved by means of a stop mechanism 86.

When the multistop function is connected, the rotor 25 is stopped practically immediately, independently of the rotating position, when one tries to rotate it in the opposite direction to the winding-up direction. This multistop function is achieved by means of a free-wheeling hub mechanism 87 which permits rotation of the rotor in the winding-up direction, but not in the opposite direction.

The release function, i.e. free rotation of the rotor in the opposite direction to the winding-up direction, is achieved by disconnecting both the stop mechanism 86 and the free-wheeling hub mechanism 87. This disconnection as well as the switching between the three functions are effected by means of an operating mechanism 88.

The mechanisms 86, 87 and 88 will now be described in more detail.

Figure 4:
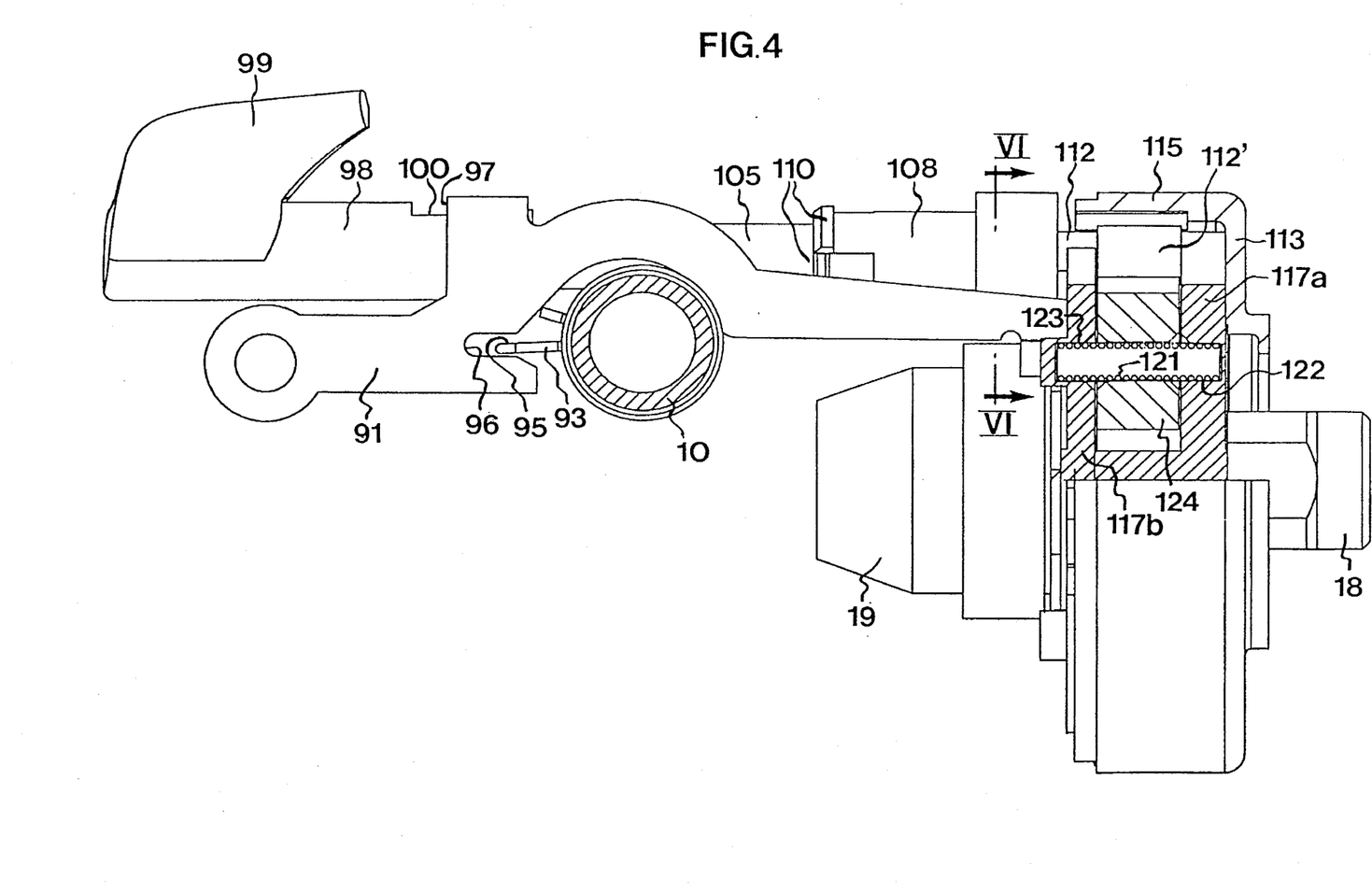
FIG. 4 being a part-sectional side view illustrating an operating mechanism, a stop mechanism and the antireverse unit, FIG. 5 being a rear view (from the left in FIG. 4) of the antireverse unit and the operating mechanism, the other components of the fishing reel being removed, and FIG. 6 being a sectional view along line VI—VI in FIG. 4.

The stop mechanism 86 comprises a stop washer 89, whose through-hole is of a cross-section corresponding to the cross-sectional shape of the rotor shaft 18 and which is therefore non-rotatably supported on the rotor shaft 18. The stop washer 89 has a pawl-like stop lug 90. The stop mechanism 86 further comprises a stop arm 91 arranged in the housing 91 and extending in parallel with the rotor shaft 18 and being pivotable about a pivot pin at right angles thereto, which is formed of a screw 92, by means of which the stop arm 91 is attached to the housing 1. The stop arm 91 is, in a narrow area, pivotable between an operative lower position (see e.g. FIG. 4), in which it abuts against the circumference of the stop washer 89 so as to engage, as the rotor shaft 18 rotates in the opposite direction to the winding-up direction, with the stop lug 90 and stop the rotor shaft 18 and, thus, the rotor 25 in a rotating position determined by the position of the stop lug 90 in the circumferential direction of the stop washer 89, and an inoperative upper position (see e.g. FIGS. 7 and 10), in which it is moved away from the circumference of the stop washer 89. The rotating position determined by the stop lug 90 corresponds to the above-mentioned, predetermined rotor position, in which the line roller 32*b* is located in its upper position. A spring 93, which consists of a steel wire bent to substantially circular shape, is placed in a groove 94 formed in the gear drive 10. The spring 93 is at one end bent to a substantially straight angle to form a spring leg 95 engaging in a forwardly open slit 96 in the stop arm 91. As the handle 6 and, thus, the gear drive 10 are rotated in the retrieving direction, the spring leg 95 strives to press the stop arm 91 upwards to its inoperative position. As the handle 6 and, thus, the gear drive 10 are rotated in the opposite direction, the spring leg 95 strives on the other hand to press the stop arm 91 downwards to its operative position. The stop arm 91 has in its rear portion a laterally directed projection 97 for cooperation with the operating mechanism 88.

Figure 5:
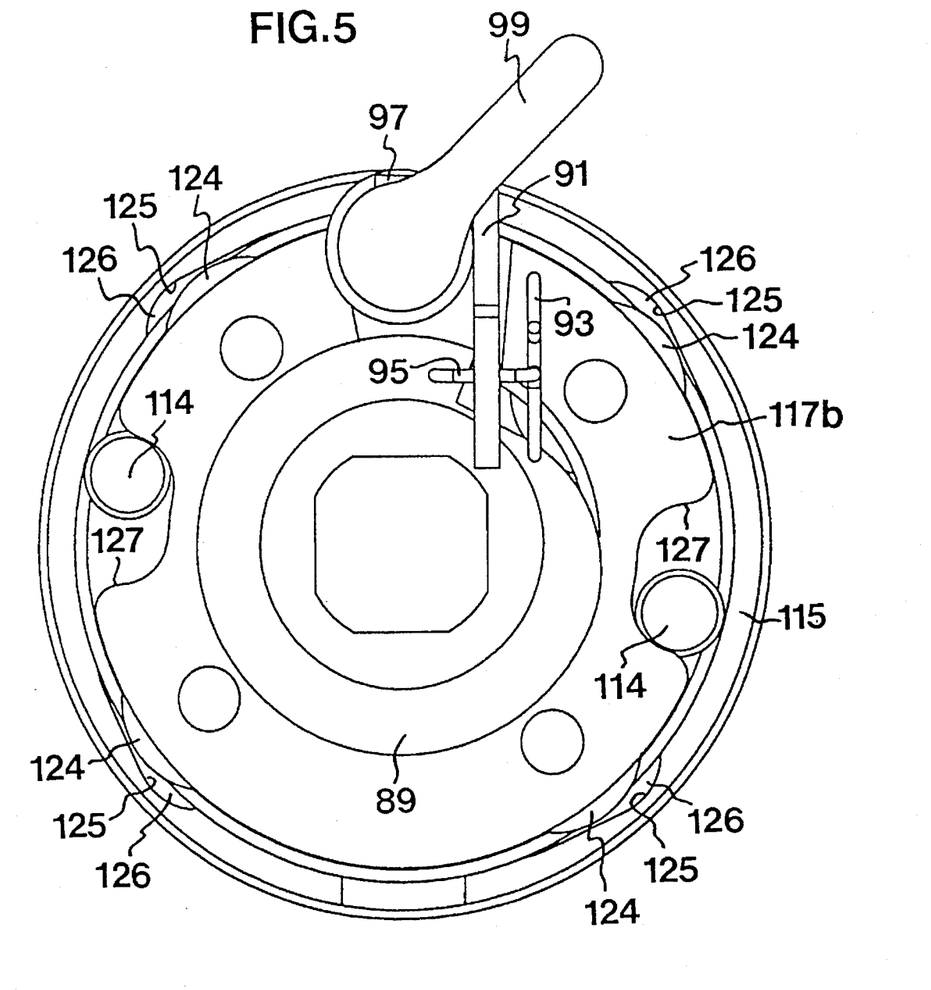

The operating mechanism 88 comprises an adjusting member 98 arranged in the housing 1 and turnable about an axis in parallel with the rotor shaft 18. The adjusting member 98 has a portion projecting at the rear side of the housing 1 and forming an adjusting arm 99, by means of which the adjusting member 98 is manually turnable between three different adjusting positions, viz. a first position, in which the arm 99 points obliquely upwards to the left (see FIGS. 11 and 13), a second position, in which the arm 99 points straight upwards (see FIG. 8) and a third position, in which the arm 99 points obliquely upwards to the right (see FIG. 5). The adjusting member 98 has a cam surface 100, against which the projection 97 of the stop arm 91 abuts. The cam surface 100 is so designed that in the first and second adjusting positions of the adjusting arm 99, the cam surface holds the stop arm 91 in its inoperative upper position (see FIGS. 7 and 10), whereas in the third adjusting position of the adjusting arm 99, the cam surface permits lowering of the stop arm 91 to its operative position (see FIG. 4).

The adjusting arm 99 has in its underside a recess 101 (see FIG. 3), the bottom surface of which consists of three planar surfaces successively arranged in the turning direction of the arm 99 and angled in relation to each other. The angle between these planar surfaces corresponds to the turning angle of the arm 99 between the adjusting positions. Just in front of the recess 101, the housing 1 has a vertical bore 102, in which a compression spring 103 is placed. The spring 103 supports at its upper end a cylindrical pin 104 and presses the planar upper face thereof against the bottom of the recess 101. The spring 103 and the pin 104, whose diameter is slightly smaller than the diameter of the bore 102, thus strive to retain the adjusting arm 99 in its adjusting position. When the arm 99 is turned from an adjusting position, in which the planar upper face of the pin 104 is pressed against one of the planar surfaces of the recess 101, the pin 104 is pressed down, against the action of the spring 103, first a distance into the bore 102 so as to be pressed up again, such that its planar upper face comes into surface engagement with one of the other planar surfaces of the recess 101.

The adjusting member 98 is non-rotatably connected to a shaft 105 and has, to this end, in its front end portion a non-circular hole 106, into which a correspondingly designed rear end portion 107 of the shaft 105 is inserted. The shaft 105 non-rotatably supports a front sleeve member 108 which, to this end, has in its rear portion a non-circular hole, into which a correspondingly designed, front end portion 109 of the shaft 105 is inserted. The sleeve member 108 is axially fixed to the shaft 105 by means of a snap lock 110 (see FIG. 4). The sleeve member 108 has also in its front portion a non-circular hole 111. As best seen in FIGS. 6, 9, 12 and 14, the hole 111 is radially elongate in cross-section. In addition to the adjusting member 98, the shaft 105 and the sleeve member 108, the operating mechanism 88 includes a locking member 112 in the form of a resilient pin formed of a closely spun helical spring, whose rear end portion is inserted into the front hole 111 of the sleeve member 108. The function of the locking member 112 will be described in more detail below.

The free-wheeling hub mechanism 87 has a cover 113, which is non-rotatably connected to the housing 1 by means of two screws 114. The cover 113 has a backwardly extending cylindrical flange 115, which forms an outer ring, concentric with the rotor shaft 18, in the free-wheeling hub mechanism 87. A ring 116, whose through-hole is of a cross-section corresponding to the cross-sectional shape of the rotor shaft 18, is non-rotatably supported on the rotor shaft. The ring 116 is placed inside the cover 113 just in front of the cylindrical flange or outer ring 115 and forms an inner ring, concentric with the outer ring 115, in the free-wheeling hub mechanism 87. An annular roll holder 117a, 117b is arranged in the annular gap between the two rings 115 and 116. The roll holder consists of an annular front part 117a and a rear part 117b, which is in the form of a ring divided by a gap 118. The two parts 117a and 117b are non-rotatably interconnected, the rear part 117b having, to this end, two diametrically opposed, forwardly directed connecting pins 119, which with a close fit are inserted into the corresponding holes (not shown) in two diametrically opposed, rearwardly directed projections 120 of the front part 117a. The two parts 117a and 117b support between themselves four roll shafts 121 which consist of closely spun helical springs and extend substantially in parallel with the rotor shaft 18. The roll shafts 121 are uniformly distributed in the circumferential direction of the roll holder 117a, 117b. Each roll shaft 121 is at its rear end inserted into a bore 122 (see FIGS. 4, 7 and 10) in the front part 117a and into an opposite bore 123 in the rear part 117b. The locking member 112, which as mentioned above also comprises a closely spun helical spring, extends from the sleeve member 108 substantially in parallel with the rotor shaft 18 through the gap 118 of the rear part 117b and is at its front end inserted into a sleeve portion 112' projecting backwardly from the front part 117a. Each roll shaft 121 rotatably supports a roll 124 which, owing to the position and construction of the roll shaft, resiliently abuts against the inner ring 116.

The outer ring 115 has for each roll 124 an internal ramp surface 125 (see FIGS. 5, 8, 11 and 13), which together with the inner ring 116 defines a space 126 widening as seen in the winding-up direction of the rotor 25 and intended for the roll 124.

The roll holder 117a, 117b has along its circumference two diametrically opposed recesses 127, through which the screws 114 extend. The recesses 127 are of such an extent in the circumferential direction that the roll holder 117a, 117b is, within narrow limits, turnable back and forth about the rotor shaft 18 between a first turning position (see FIG. 13), in which the rolls 124 are located in the narrow portion of the respective spaces 126 and clamped or pinched between the inner ring 116 and the respective ramp surfaces 125 of the outer ring 115, and a second turning position (see FIGS. 5, 8 and 11), in which the rolls 124 are located in the wide portion of the respective spaces 126 and abut against the inner ring 116 only to be rotated thereby.

A ball bearing 128 is arranged between the distance sleeve 21 and a front hub portion 129 on the cover 113. A ball bearing 130 is arranged between the rotor shaft 18 and the housing 1. A washer 131 non-rotatably connected to the rotor shaft 18 abuts against the inner ring of the ball bearing 130 (see FIG. 3).

Figure 6:
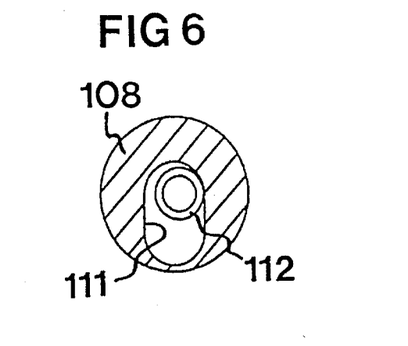

In the first state of the fishing reel as shown in FIGS. 3–6, the adjusting member 98 is in its third adjusting position, in which the arm 99 points obliquely upwards to the right, the stop arm 91 is in its operative lower position, to which it has been moved by the spring 93 by rotation of the handle 6 and, thus, the gear drive 10 in the opposite direction to the retrieving direction, and the roll holder 117a, 117b is in its second turning position, in which the rolls 124 resiliently abut against the inner ring 116 only. The roll holder 117a, 117b is held in its second turning position by the locking member 112, which engages in the hole 111 of the sleeve member 108. A turning of the roll holder 117a, 117b from its second position to its first position corresponds to the locking member 112 being moved to the right in FIG. 6. Such a movement of the locking member 112 in the hole can, as shown in FIG. 6, not occur when the adjusting member 98 is in its third adjusting position. The free-wheeling hub mechanism 87 thus is disconnected. In the first state as shown in FIGS. 3–6, the single stop function thus is connected.

Figure 7:
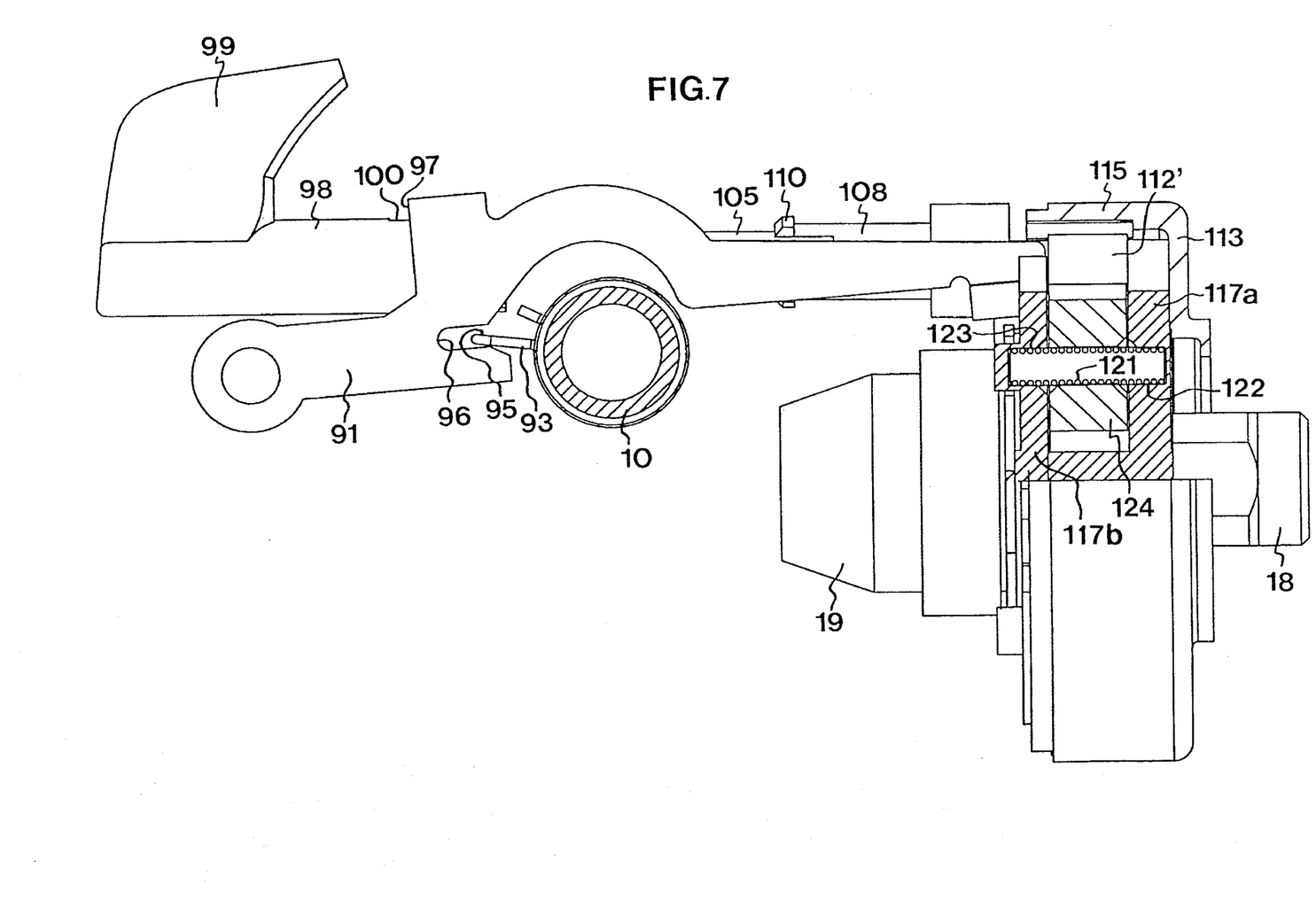
FIGS. 7–9 concern a second state of the fishing reel in FIG. 1, FIGS. 7, 8 and 9 corresponding to FIGS. 4, 5 and 6, respectively.
Figure 8:
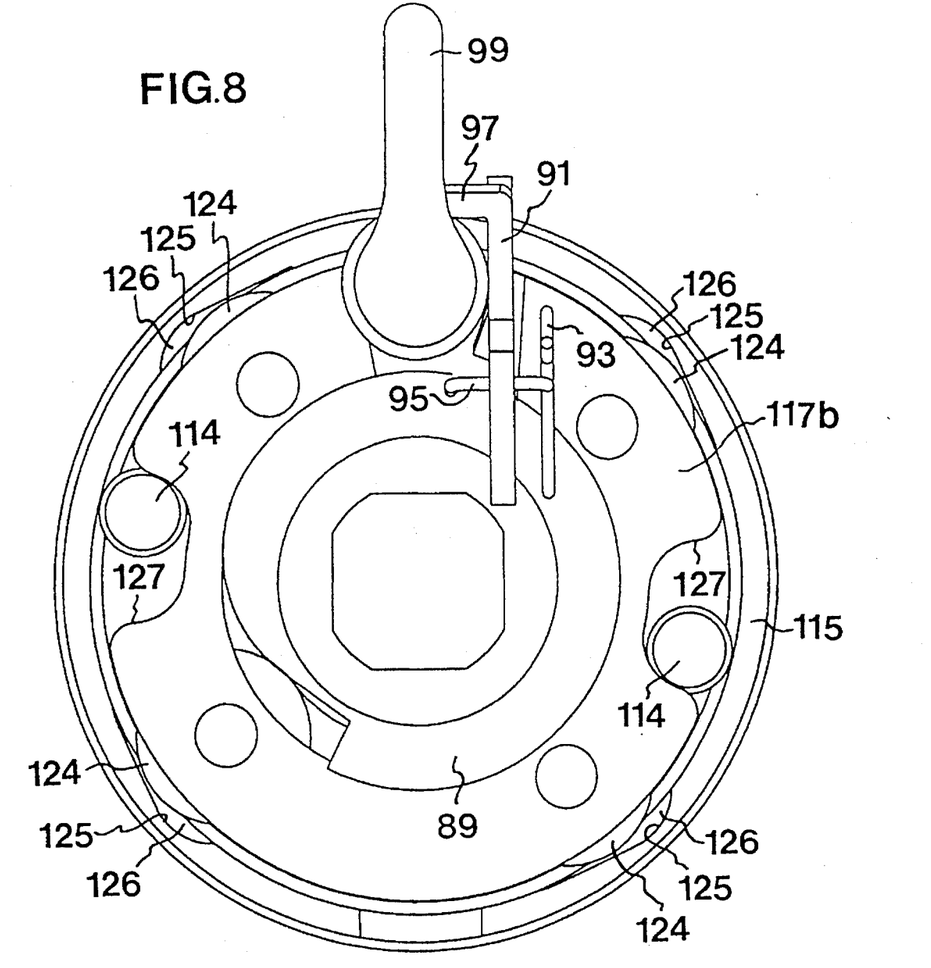
Figure 9:
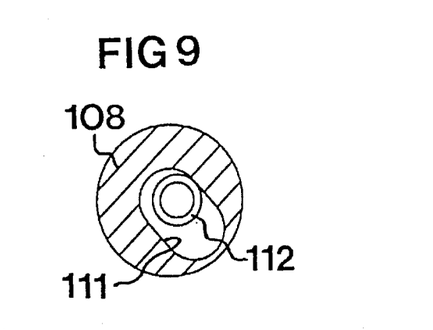

In the second state of the fishing reel as shown in FIGS. 7–9, the adjusting member 98 in its second adjusting position, in which the arm 99 points straight upwards, the stop arm 91 is in its inoperative position, to which it is raised by the cam surface 100 of the adjusting member 98 during turning thereof from the first adjusting position, and the roll holder 117a, 117b is in its second turning position. The roll holder 117a, 117b is held in the same manner as in the first state of the fishing reel also here in its second turning position by the locking member 112 and the sleeve member 108 (see FIG. 9). Both the stop mechanism 86 and the free-wheeling hub mechanism 87 thus are disconnected. In the second state shown in FIGS. 7–9, the release function thus is connected.

Figure 10:
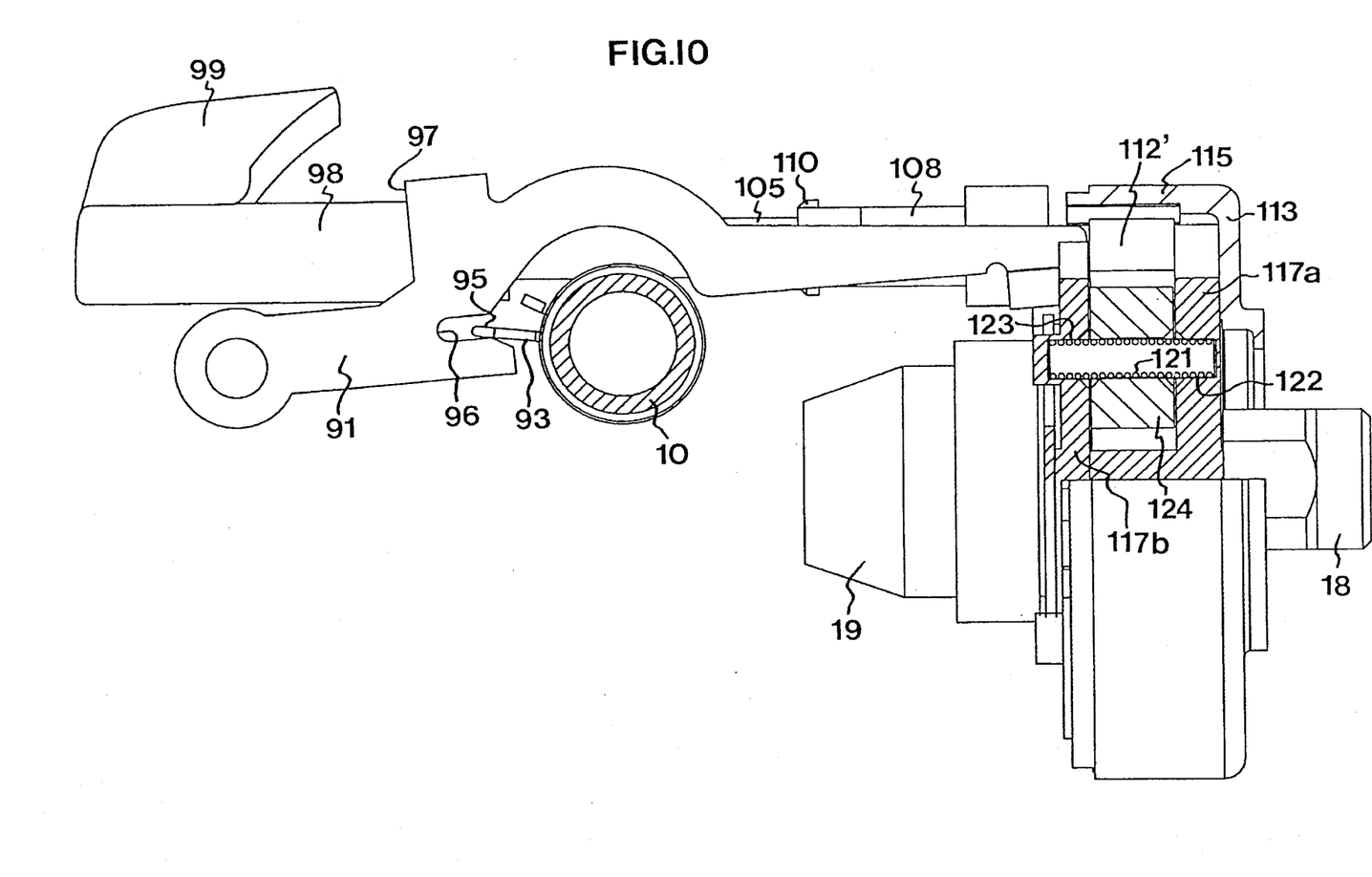
FIGS. 10–12 concern a third state of the fishing reel in FIG. 1, FIGS. 10, 11 and 12 corresponding to FIGS. 4, 5 and 6, respectively.
Figure 11:
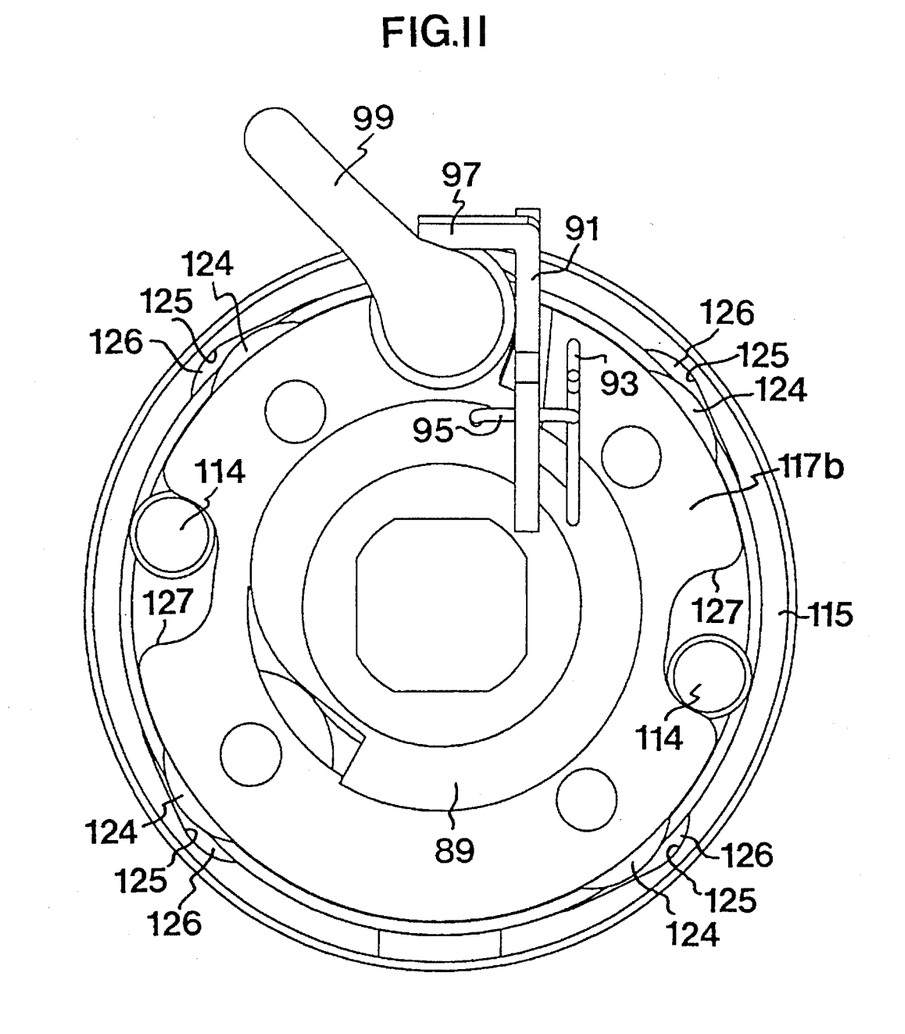
Figure 12:
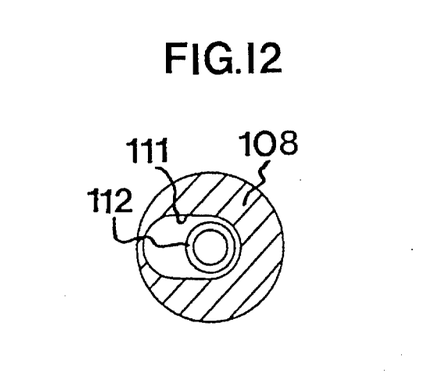

In the third state of the fishing reel as shown in FIGS. 10–12, the adjusting member 98 is in its first adjusting position, in which the arm 99 points obliquely upwards to the left, the stop arm 91 is in its inoperative upper position, in which it is retained by the cam surface 100, and the roll holder 117a, 117b is in its second turning position, in which it is, however, not held by the locking member 112 and the sleeve member 108, since the locking member 112 can be moved to the right in the hole 111 of the sleeve member 108 when the adjusting member 98 is in its third adjusting position (see FIG. 12).

As the handle 6 is rotated in the retrieving direction, the inner ring 116 is rotated in the winding-up direction, whereby the rolls 124 are rotated on their shafts 121, which press the rolls into resilient abutment against the inner ring.

Figure 13:
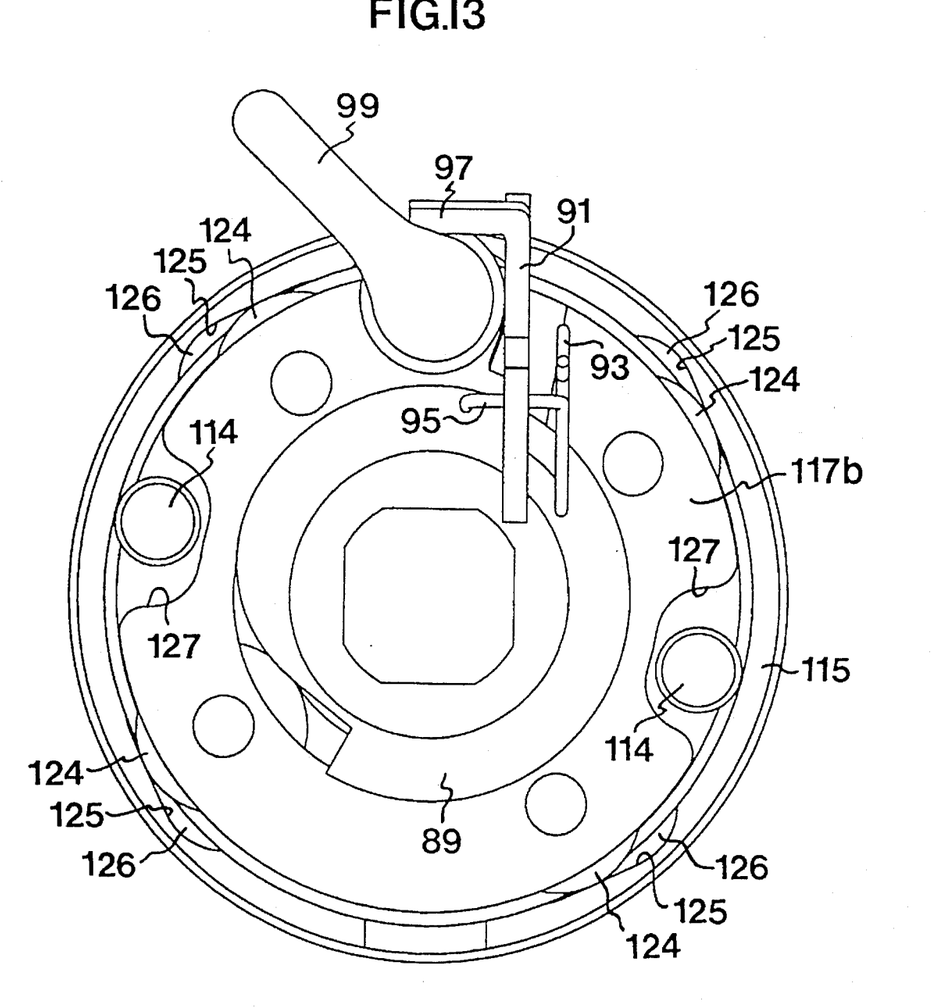
FIGS. 13 and 14 concern a fourth state of the fishing reel in FIG. 1 and correspond to FIGS. 5 and 6, respectively.
Figure 14:
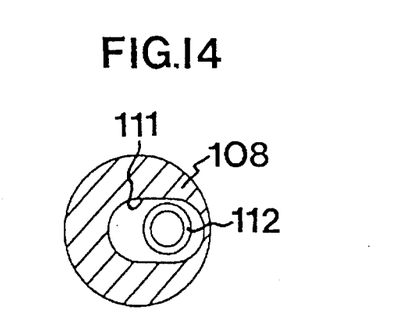

When one tries to rotate the handle 6 in the opposite direction to the retrieving direction or in some other manner tries to rotate the rotor 25 in the opposite direction to the winding-up direction, the inner ring 116 moves the rolls 124 into the narrow portion of the spaces 126, where the rolls 124 are clamped between the inner ring 116 and the respective cam surfaces 125 of the outer ring 115, thereby stopping the rotation of the inner ring and, thus, the rotor 25 in the opposite direction to the winding-up direction. When the rolls 124 are inserted into the narrow portion of the spaces 126, they rotate, by means of the shafts 121, the roll holder 117a, 117b to its first turning position. Through this turning of the roll holder 117a, 117b, the fourth state of the fishing reel as shown in FIGS. 13 and 14 is obtained, which differs from the third state only by the locking member 112 being moved to the right in the hole 111 of the sleeve member 108 (see FIG. 14) by the roll holder 117a, 117b being turned to its first turning position.

In the states shown in FIGS. 10–12 and 13–14, the multistop function thus is connected.

By the rolls 124 being mounted on spring shafts 121, a self-centering action is achieved, owing to which small intolerances can be absorbed and thus all the rolls 124 are clamped, i.e. no roll abuts against the inner ring 116 only owing to intolerances, when the roll holder 117a, 117b is in its first turning position.

What I claim and desire to secure by Letters Patent is:

1. An open-face fishing reel of the fixed-spool type, comprising a housing;

a spindle mounted in the housing and extending forwardly therefrom;

a hollow rotor shaft which is rotatably mounted on the spindle and supports a gear wheel non-rotatably connected to the rotor shaft;

a drive shaft mounted in the housing;

a handle for rotating the drive shaft;

a gear drive which is non-rotatably arranged on the drive shaft and meshes with the gear wheel of the rotor shaft, for rotating the rotor shaft on rotation of the drive shaft;

a line spool rotatably mounted on the spindle in front of the rotor shaft;

a rotor non-rotatably mounted on the rotor shaft and supporting a bail mechanism which is arranged, upon rotation of the rotor in one direction, to wind a fishing line onto the line spool; and a free-wheeling hub mechanism which is operatively arranged between the housing and the rotor shaft and comprises an outer ring fixedly connected to the housing coaxially with the rotor shaft, an inner ring non-rotatably mounted on the rotor shaft and positioned inside the outer ring, an annular gap extending between the two rings, and an annular roll holder arranged in the gap and supporting at least two rolls, whose axes are substantially parallel with the rotor shaft and which are uniformly distributed around the rotor shaft;

wherein the rolls are rotatably supported on resilient shafts connected to the roll holder and adapted to hold the rolls in resilient abutment against the inner ring;

wherein the outer ring has, for each roll, an internal ramp surface, which together with the inner ring defines a space intended for the roll and widening in said one direction of rotation of the rotor;

wherein the roll holder is, within narrow limits, turnable back and forth about the rotor shaft between a first turning position to which the roll holder is movable by rotation of the inner ring in the opposite direction to said one direction and in which the rolls are positioned in a narrow portion of the respective spaces and clamped between the inner ring and the associated ramp surface of the outer ring, thereby preventing rotation of the rotor in the opposite direction to said one direction, and a second turning position, to which the roll holder is movable by rotation of the inner ring in said one direction and in which the rolls are positioned in the wide portion of the respective spaces and abut against the inner ring only to be rotated thereby.

2. A fishing reel as claimed in claim 1, wherein the roll holder is lockable in such a manner in the second turning position by means of an operating mechanism that it is retained in this position also as the inner ring is rotated in the opposite direction to said one direction.

3. A fishing reel as claimed in claim 2, wherein the operating mechanism comprises an adjusting member arranged in the housing and operable from an outside thereof, said adjusting member being adjustable between a first adjusting position and at least one further adjusting position, and a locking member connected to the roll holder and coupled to the adjusting member in such a manner that, in the first position of the adjusting member, it permits turning of the roll holder between its first and second turning positions, and, when the adjusting member is in each of its further adjusting positions, locks the roll holder in its second turning position.

4. A fishing reel as claimed in claim 3, comprising a stop mechanism which has a stop washer non-rotatably connected to the rotor shaft and having a pawl-like stop lug and a stop arm arranged in the housing and pivotable about a pivot pin extending substantially at right angles to the rotor shaft between an operative position, in which it abuts against the stop washer so as to come into engagement, as the rotor shaft rotates in the opposite direction to said one direction, with the stop lug and stop the rotor shaft and, thus, the rotor in a rotating position determined by the position of the stop lug in the circumferential direction of the stop washer, and an inoperative position, in which it is moved away from the stop washer.

5. A fishing reel as claimed in claim 4, wherein the adjusting member of the operating mechanism is adjustable between the first adjusting position and two further adjusting positions, and the adjusting member is connected to the stop arm in such a manner that in its first adjusting position and one of its two further adjusting positions, the adjusting member holds the stop arm in its inoperative position, and in the other one of its two further adjusting positions permits pivoting of the stop arm to its operative position.

6. A fishing reel as claimed in claim 1, wherein the resilient shafts of the rolls are closely spun helical springs.

* * * * *